(12) United States Patent
Matsuyama et al.

(10) Patent No.: US 9,316,156 B2
(45) Date of Patent: Apr. 19, 2016

(54) ACOUSTIC DAMPER, COMBUSTOR AND GAS TURBINE

(71) Applicant: MITSUBISHI HEAVY INDUSTRIES, LTD., Tokyo (JP)

(72) Inventors: Keisuke Matsuyama, Tokyo (JP); Sosuke Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 480 days.

(21) Appl. No.: 13/774,652

(22) Filed: Feb. 22, 2013

(65) Prior Publication Data

US 2013/0223989 A1   Aug. 29, 2013

(30) Foreign Application Priority Data

Feb. 24, 2012  (JP) ................................. 2012-038807

(51) Int. Cl.
*F02C 7/24*    (2006.01)

(52) U.S. Cl.
CPC ......... *F02C 7/24* (2013.01); *F23R 2900/00014* (2013.01)

(58) Field of Classification Search
CPC ................ F02C 7/24; F02C 1/00; F23R 3/00; F01N 13/00
See application file for complete search history.

(56) References Cited

U.S. PATENT DOCUMENTS

| | | | |
|---|---|---|---|
| 4,106,587 A | 8/1978 | Nash et al. | |
| 4,944,362 A | 7/1990 | Motsinger et al. | |
| 5,685,157 A | 11/1997 | Pandalai et al. | |
| 6,920,758 B2 * | 7/2005 | Matsuyama | F23R 3/286 |
| | | | 431/114 |
| 7,104,065 B2 * | 9/2006 | Benz | F23R 3/002 |
| | | | 60/725 |
| 7,413,053 B2 | 8/2008 | Wasif et al. | |
| 7,549,290 B2 * | 6/2009 | Holt | F23M 5/085 |
| | | | 431/114 |
| 8,469,141 B2 * | 6/2013 | Wang | F23R 3/002 |
| | | | 181/212 |
| 8,733,496 B2 * | 5/2014 | Ono | F02C 7/24 |
| | | | 181/213 |
| 8,839,624 B2 * | 9/2014 | Schnell | F23R 3/002 |
| | | | 431/114 |
| 2005/0223707 A1 * | 10/2005 | Ikeda et al. | 60/725 |
| 2006/0059913 A1 | 3/2006 | Bethke et al. | |
| 2007/0034447 A1 * | 2/2007 | Proscia | F01D 25/30 |
| | | | 181/290 |
| 2007/0169992 A1 * | 7/2007 | Wasif | F23M 20/005 |
| | | | 181/293 |
| 2010/0251718 A1 * | 10/2010 | Ito | F01D 25/04 |
| | | | 60/725 |

(Continued)

FOREIGN PATENT DOCUMENTS

| | | |
|---|---|---|
| CN | 1407225 A | 4/2003 |
| CN | 1551965 A | 12/2004 |

(Continued)

OTHER PUBLICATIONS

International Search Report of PCT/JP2013/054532, date of mailing Apr. 23, 2013 (with English translation, 9 pages).

(Continued)

*Primary Examiner* — Jorge Pereiro
*Assistant Examiner* — Shafiq Mian
(74) *Attorney, Agent, or Firm* — Westerman, Hattori, Daniels & Adrian, LLP (57) ABSTRACT

An acoustic damper of the present invention is objected to obtain a sound absorption effect of a combustor in an extensive range of frequency band. The acoustic damper includes an acoustic pipe body attached to a combustor so as to communicate with an inside of the combustor, and the acoustic pipe body is provided with a plurality of passages whose extension lengths are different from each other inside the acoustic pipe body.

4 Claims, 6 Drawing Sheets

(56) References Cited

U.S. PATENT DOCUMENTS

| | | | |
|---|---|---|---|
| 2011/0220433 A1 | 9/2011 | Nakamura et al. | |
| 2013/0291543 A1* | 11/2013 | Kim | F23R 3/002 60/725 |
| 2014/0013756 A1* | 1/2014 | Melton | F02C 7/22 60/725 |

FOREIGN PATENT DOCUMENTS

| | | | |
|---|---|---|---|
| JP | 53-14213 A | | 2/1978 |
| JP | 2-161134 A | | 6/1990 |
| JP | 4-347312 A | | 12/1992 |
| JP | 2004-183943 A | | 7/2004 |
| JP | 2004-183946 A | | 7/2004 |
| JP | 2006-22966 A | | 1/2006 |
| JP | 2006022966 A | * | 1/2006 |
| JP | 2006-132505 A | | 5/2006 |
| JP | 2009-144975 A | | 7/2009 |
| JP | 4494889 B2 | | 6/2010 |
| WO | 2009/066706 A1 | | 5/2009 |
| WO | 2010/097982 A1 | | 9/2010 |
| WO | 2012/127959 A1 | | 9/2012 |

OTHER PUBLICATIONS

Written Opinion of the International Searching Authority date of mailing Apr. 23, 2013, issued in International Application No. PCT/JP2013/054532 (with English translation, 16 pages).

Notice of Reasons for Rejection dated Apr. 1, 2015, issued in corresponding Japanese Patent Application No. 2014-500950 with English Translation (8 pages).

European Search Report dated Sep. 2, 2015, issued in counterpart EP application No. 13751734.8 (6 pages).

Chinese Office Action dated Sep. 2, 2015, issued in counterpart Chinese application No. 201380010157.6, (11 pages), with translation.

* cited by examiner

ACOUSTIC DAMPER, COMBUSTOR AND GAS TURBINE

TECHNICAL FIELD

The present invention relates to an acoustic damper, a combustor, and a gas turbine.

This application claims priority to and the benefit of Japanese Patent Application No. 2012-038807 filed on Feb. 24, 2012, the disclosure of which is incorporated herein by reference.

BACKGROUND ART

A gas turbine includes a compressor, a combustor and a turbine. The compressor is configured to compress air taken therein to high pressure and pumps the high-pressure compressed air into the combustor. The combustor is configured to supply a fuel to the high-pressure air pumped from the compressor and burn the fuel and send a high-temperature combustion gas generated by combustion of the fuel to the turbine. The turbine is configured to be rotatably driven by the combustion gas sent from the combustor. In addition, the turbine is configured so that a rotating shaft of the compressor formed integrally with the rotating shaft of the turbine is rotatably driven, thereby driving the compressor.

The above-mentioned combustor of the gas turbine has a property by which combustion oscillation is generated by resonance oscillation with an air column when the fuel burns in the combustor. This combustion oscillation not only becomes a cause of noise generation, but also causes extreme vibration in the combustor when the combustion oscillation is equal to or greater than a predetermined level or when the combustion oscillation resonates with the combustor body. Thus, there is a risk of malfunction in which a supporting member of the combustor is excessively worn or cracks occur in the combustor body. Therefore, as disclosed in Patent Document 1 or 2, for example, the combustion oscillation of the combustor is suppressed by attaching an acoustic damper having a resonance space around the combustor.

PRIOR ART DOCUMENT

Patent Document

[Patent Document 1] Japanese Unexamined Patent Application, First Publication No. 2006-132505
[Patent Document 2] Japanese Unexamined Patent Application First Publication No. H2-161134

SUMMARY OF THE INVENTION

Problems to be Solved by the Invention

However, there is a problem that when the acoustic damper attached to the combustor of a conventional gas turbine is of a Helmholtz resonator type, only a sound absorption effect of one specific frequency band is obtained. Another problem is that, when an acoustic damper having a sound absorption effect in an extensive range of frequency band is desired to be obtained, the structure thereof becomes complicated and the cost increases.

Accordingly, in consideration of the above-mentioned circumstances, it is an object of the present invention to provide an acoustic damper whereby a sound absorption effect of a combustor can be obtained in an extensive range of frequency band which has a simple structure, a combustor including the above acoustic damper attached thereto, and a gas turbine including the above combustor, which has a simple structure.

Means for Solving the Problems

According to the present invention, an acoustic damper includes an acoustic pipe body attached to a combustor so as to communicate with an inside of the combustor, wherein the acoustic pipe body is provided with a plurality of passages whose extension lengths are different from each other inside the acoustic pipe body.

An acoustic damper having the above-mentioned configuration includes the plurality of acoustic pipes with the different passage lengths formed in the acoustic pipe body whereby a sound absorption effect of a plurality of different frequency bands is obtained. Therefore, it is possible to provide an acoustic damper having a broad resonance frequency response characteristic.

In the acoustic damper according to the present invention, the plurality of passages are defined by the acoustic pipe body, a separating plate installed in the acoustic pipe body, and a partitioning plate installed between an inner wall surface of the acoustic pipe body and the separating plate, and one end side of the separating plate is disposed separately from a wall surface opposite to a side at which the acoustic pipe body is attached to the combustor, and the partitioning plate is installed between one surface of the separating plate and the inner wall surface of the acoustic pipe body facing the one surface, and thereby the plurality of passages may be formed therein.

The acoustic damper having the above-mentioned configuration includes two acoustic pipes that have the different passage lengths and that are formed by installing the separating plate and the partitioning plate in the acoustic pipe body. Therefore, it is possible to provide an acoustic damper whereby a sound absorption effect of two specific frequency bands is obtained. Further, an external force of the sound wave generated on the partitioning plate for forming two acoustic pipes is offset by opposing between the neighboring acoustic pipes, and thereby it is possible to offset a structural vibration due to sound waves.

In the acoustic damper according to the present invention, the plurality of passages are defined by the acoustic pipe body and a plurality of separating plates installed in the acoustic pipe body, the plurality of separating plates are different in extension lengths each other, and arranged approximately in parallel at a predetermined interval from each other, and each one end side of the plurality of separating plates is connected to the wall surface opposite to the side at which the acoustic pipe body is attached to the combustor, and thereby the plurality of passages may be formed therein.

In the acoustic damper having the above-mentioned configuration includes a plurality of acoustic pipes that have the different passage lengths are formed by installing a plurality of separating plates in the acoustic pipe body. Therefore, it is possible to provide an acoustic damper whereby a sound absorption effect of a plurality of different frequency bands is obtained.

In the acoustic damper according to the present invention, the plurality of passages are defined by the acoustic pipe body and a plurality of separating plates installed in the acoustic pipe body, the plurality of separating plates are different in extension lengths from each other, and are arranged approximately in parallel at predetermined intervals from each other, and each one end side of the plurality of separating plates on the side at which the acoustic pipe body is attached to the combustor is arranged in such a way that end portions thereof in an extending direction are lined up, and each other end side of the plurality of separating plates is connected to the wall surface opposite to the side at which the acoustic pipe body is attached to the combustor, and thereby the plurality of passages may be formed therein.

In the acoustic damper having the above-mentioned configuration, a plurality of acoustic pipes that have the passage different lengths are formed by installing a plurality of separating plates in the acoustic pipe body. Therefore, it is possible to provide an acoustic damper whereby a sound absorption effect of a plurality of different frequency bands is obtained, and the outer appearance shape of the acoustic pipe body on the other end side of the separating plate can be made small.

In the acoustic damper according to the present invention, the plurality of passages are defined by the acoustic pipe body, a first separating plate and a second separating plate which are installed in the acoustic pipe body, a first partitioning plate installed between the inner wall surface of the acoustic pipe body and the first separating plate, and a second partitioning plate installed between the inner wall surface of the acoustic pipe body and the second separating plate, one end side of the first separating plate in the extending direction is arranged separately from the wall surface opposite to the side at which the acoustic pipe body is attached to the combustor, the first partitioning plate is installed between one surface of the first separating plate and the inner wall surface of the acoustic pipe body facing the one surface, the second separating plate is installed approximately in parallel at a predetermined interval on the other surface side of the first separating plate, one end side of the second separating plate in the extending direction is installed separately from the wall surface opposite to the side at which the acoustic pipe body is attached to the combustor, and a unit which is formed by installing the second partitioning plate between one surface of the second separating plate and the inner wall surface of the acoustic pipe body facing the one surface is symmetrically installed about an axial center line in the extending direction of the acoustic pipe body in a space formed between one end side of the first separating plate and the wall surface opposite to the side at which the acoustic pipe body is attached to the combustor, and thereby the plurality of passages may be formed therein.

The acoustic damper having the above-mentioned configuration includes a unit which is formed with a plurality of acoustic pipes that have the different passage lengths and that are formed by the first separating plate, the second separating plate, the first partitioning plate and the second partitioning plate, and is symmetrically installed about an axial center line of the acoustic pipe body. Therefore, it is possible to provide an acoustic damper whereby a sound absorption effect of a plurality of different frequency bands is obtained. The external force of a sound wave generated on each partitioning plate is offset by opposing between the neighboring acoustic pipes, so that the structural vibration due to the sound wave can be canceled.

In the acoustic damper according to the present invention, the plurality of passages are defined by the acoustic pipe body and separating plates spirally wound in the acoustic pipe body, and the plurality of separating plates are opposed in a direction separating from the side at which the acoustic pipe body is attached to the combustor, and thereby the plurality of passages may be formed therein.

The acoustic damper having the above-mentioned configuration includes separating plates spirally wound in the acoustic pipe body. Therefore, it is possible to provide an acoustic damper whereby a sound absorption effect of a plurality of different frequency bands is obtained.

In the acoustic damper according to present invention, the separating plates may be opposed so that the wound directions of the neighboring separating plates become opposite.

The acoustic damper having the above-mentioned configuration is arranged such that the wound directions of the neighboring separating plates in the acoustic pipe body become opposite, so it is possible to provide an acoustic damper whereby a sound absorption effect of a plurality of different frequency bands is obtained.

The acoustic damper according to the present invention has the plurality of acoustic pipe bodies, and the plurality of acoustic pipe bodies may extend radially about a communicating portion with the combustor.

According to the acoustic damper having the configuration as described above, it is possible not only to obtain a high sound absorption effect in a specific frequency band, but also to contribute to the improvement of noise suppression of the combustor since a sound absorption effect is obtained over a broad band by making the effective frequency band different for every acoustic pipe body.

A combustor according to the present invention includes any one of the above acoustic dampers in order to achieve the above-mentioned object.

The combustor having the above-mentioned configuration is provided with any one of the above acoustic dampers. Therefore, it is possible to provide a combustor with an acoustic damper attached thereto whereby a sound absorption effect of a plurality of different frequency bands is obtained, and combustion oscillation of the combustor can be effectively suppressed.

A gas turbine according to the present invention includes the above combustor in order to achieve the above-mentioned object.

The gas turbine having the above-mentioned configuration includes a combustor with an acoustic damper attached thereto whereby a sound absorption effect of a plurality of different frequency bands is obtained. Therefore, it is possible to provide a gas turbine in which combustion oscillation is effectively suppressed.

Effect of the Invention

According to the acoustic damper of the present invention, it is possible to provide an acoustic damper whereby a sound absorption effect of a plurality of different frequency bands is obtained. Further, according to the combustor of the present invention including the above-mentioned acoustic damper attached thereto, the combustion oscillation can be effectively suppressed. In addition, according to the gas turbine of the present invention including the above-mentioned combustor, the combustion oscillation can be effectively suppressed.

DESCRIPTION OF EMBODIMENT

Next, embodiments of an acoustic damper according to the present invention, a combustor including the acoustic damper attached thereto, and a gas turbine including the combustor will be described with reference to the drawings.

First Embodiment

Figure 1:
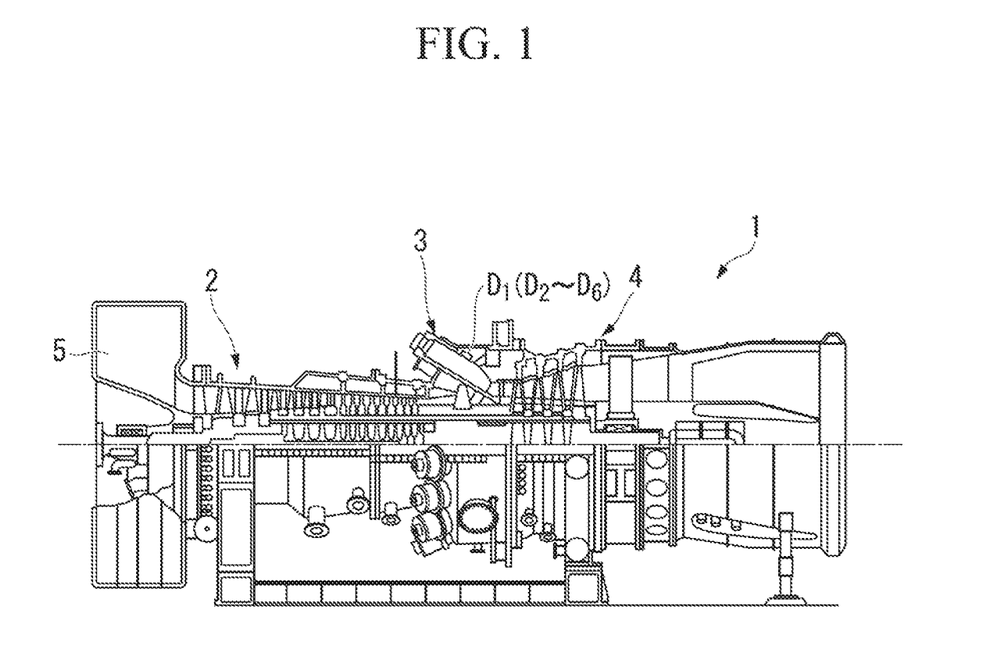
FIG. 1 is a schematic configuration diagram illustrating a cross section of an upper half of a gas turbine having a combustor with an acoustic damper attached thereto according to a first embodiment of the present invention.
Figure 2:
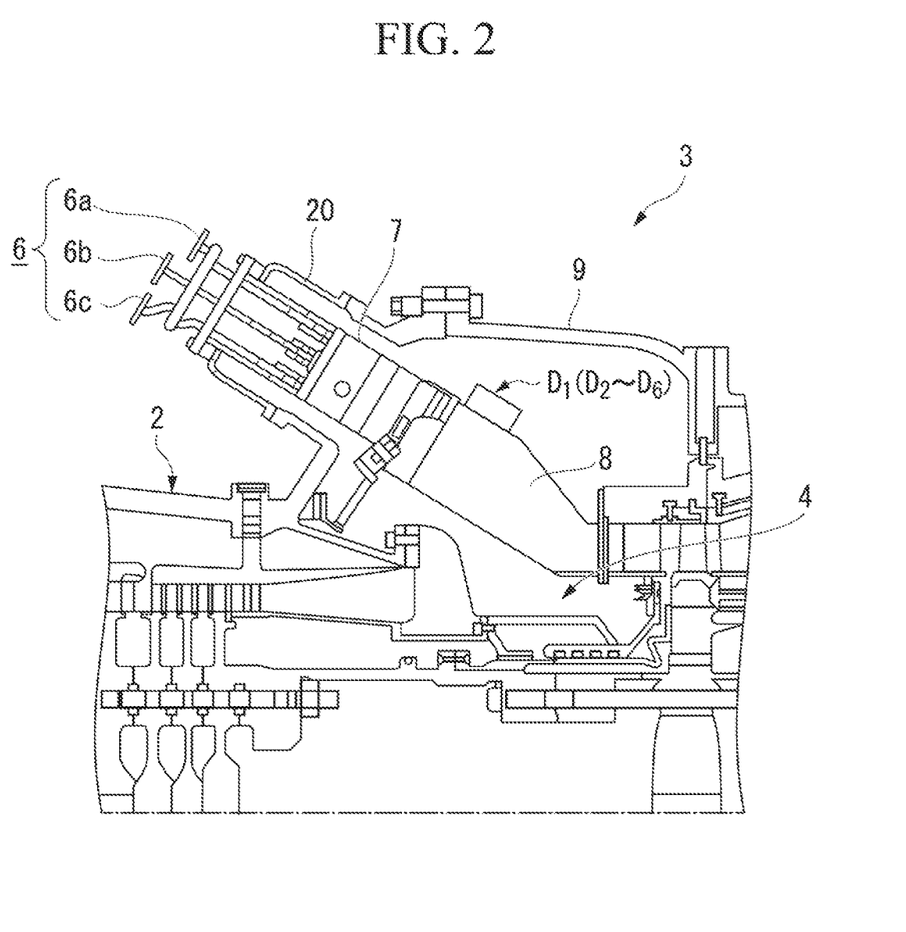
FIG. 2 is a cross-sectional view illustrating the schematic configuration of the combustor portion of the gas turbine having the combustor with the acoustic damper attached thereto according to the first embodiment of the present invention.

FIG. 1 is a schematic configuration diagram illustrating the cross section of an upper half of a gas turbine having a combustor with an acoustic damper D1 attached thereto according to a first embodiment of the present invention, and FIG. 2 is a cross-sectional view illustrating the schematic configuration of the combustor portion. Meanwhile, in these drawings, the hatching that shows the cross section is omitted to simplify the drawings. Further, "(D2 to D6)" of FIG. 1 and FIG. 2 show acoustic dampers according to second to sixth embodiments, and these acoustic dampers D2 to D6 will be described in detail later.

The gas turbine 1 includes a compressor 2, a combustor 3 with an acoustic damper D1 attached thereto, and a turbine 4, which are installed in sequence from an upstream side (left side in FIG. 1) to a downstream side (right side in FIG. 1) of an air flow. The compressor 2 is configured to compress air taken from an air intake port 5 and send the high-temperature and high-pressure compressed air to the combustor 3. The combustor 3 is configured to mix and burn the compressed air from the compressor 2 and a fuel supplied to the combustor 3, generate a high-temperature and high-pressure combustion gas, and inject the generated high-temperature and high-pressure gas toward the turbine 4. The turbine 4 is configured to have turbine vanes and turbine blades like a well-known turbine. In addition, the turbine 4 is configured such that a rotating shaft of the turbine blades is rotated by the combustion gas supplied from combustor 3, thereby driving loads such as the compressor 2 and a generator (not illustrated) due to the rotation of the rotating shaft.

Next, the combustor 3 with an acoustic damper D1 attached thereto will be described with reference to FIG. 2. The combustor 3 is provided with a nozzle unit 6, a combustor basket 7 and a transition piece 8, and is installed in a casing housing 9 that is installed so as to enclose the turbine 4.

The nozzle unit 6 is installed in an outer casing 20 that is installed at an end portion of the compressor 2 side of the casing housing 9, and has a main nozzle 6a and a pilot nozzle 6b. The nozzle unit 6 is configured to be able to supply a fuel such as natural gas, light oil or heavy oil to these nozzles 6a and 6b.

The combustor basket 7 is installed on a side to which the fuel is injected by the nozzle unit 6, and is configured such that the fuel injected from the nozzle unit 6 and the compressed air supplied from the compressor 2 are introduced therein. Therefore, the fuel supplied from the nozzle unit 6 and the compressed air supplied from the compressor 2 are mixed and burned in the combustor basket 7, thereby high-temperature and high-pressure combustion gas can be generated. The acoustic damper D1 to be described in detail later is installed on the outside of the combustor basket 7.

The transition piece 8 is formed in a cylindrical shape, and one end side of the transition piece 8 is connected to an end portion of the combustor basket 7 opposite to a side at which the nozzle unit 6 is installed. The other end side of the transition piece 8 is formed in such a way that the cross-sectional area gradually decreases, and a distal end portion of the other end side is arranged so as to be facing the turbine 4. Therefore, the transition piece 8 can supply the high-temperature and high-pressure combustion gas generated from the combustor basket 7 to the turbine 4.

Figure 3A:
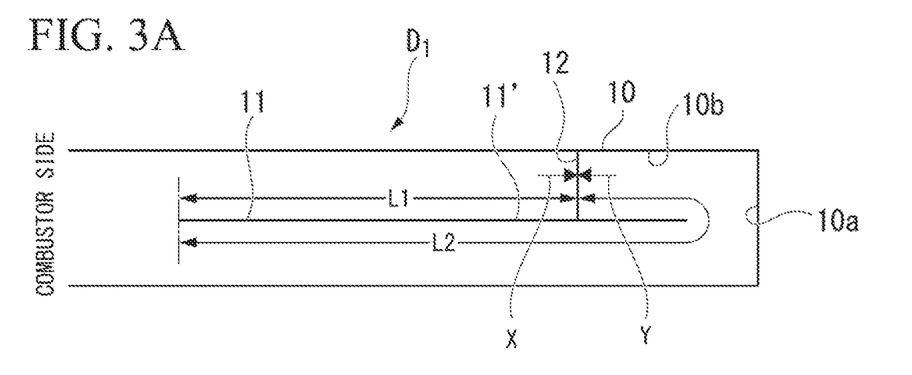
FIG. 3A is a cross-sectional view illustrating the acoustic damper according to the first embodiment of the present invention.
Figure 3B:
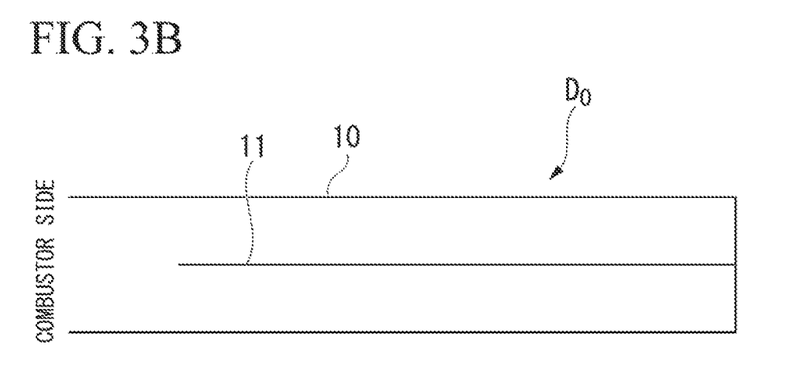
FIG. 3B is a cross-sectional view of a conventional acoustic damper.

FIG. 3A is a cross-sectional view illustrating a schematic configuration of the acoustic damper D1 according to the first embodiment of the present invention. The acoustic damper D1 has an acoustic pipe body 10, a separating plate 11 and a partitioning plate 12. Meanwhile, the thick line in the drawing illustrates a thickness shown by the cross section. This is the same in FIG. 3B, FIG. 5, and FIGS. 7 to 10 below.

The acoustic pipe body 10 is illustrated as a metal cylinder body that has one end side (left end side in FIG. 3A) opened and has a predetermined volume. The opened one end side is configured so as to be in a communicating state with the inside of the combustor basket 7 of the combustor 3. Meanwhile, the acoustic pipe body 10 illustrated in the drawing has a shape of a straight tube, but it may be formed so as to be circularly attached around the combustor basket 7. In any case, the acoustic pipe body 10 is accommodated in the casing housing 9 of the turbine 4. This is the same in the acoustic dampers D2 to D6 to be described later.

The separating plate 11 is made of a metal material, and is installed so as to bisect the inside of the acoustic pipe body 10 at an axis center position of the acoustic pipe body 10 in lengthwise direction. One end side (right end side in FIG. 3A, the same as the "terminal side" to be described later) of the separating plate 11 is installed separately at a predetermined distance from the wall surface 10a opposite to the side at which the acoustic pipe body 10 is attached to the combustor 3.

The partitioning plate 12 is made of a metal material and is installed between one surface 11' of the separating plate 11 and a wall surface 10b of the acoustic pipe body 10 facing the one surface 11. By this partitioning plate 12, two acoustic pipes (a plurality of passages) of an acoustic pipe that has a distance L1 from an end portion of the separating plate 11 on the side of the combustor 3 to the partitioning plate 12, and an acoustic pipe that has a distance L2 from the end portion of the separating plate 11 on the side of the combustor 3 to the partitioning plate 12 by bypassing the terminal side of the separating plate 11, are formed in the acoustic pipe body 10. That is, the two acoustic pipes (a plurality of passages) are defined by the acoustic pipe body 10, the separating plate 11 installed in the acoustic pipe body 10, and the partitioning plate 12 installed between the wall surface 10b of the acoustic pipe body 10 and the separating plate 11.

In the acoustic damper D1 having the above-mentioned configuration, the separating plate 11 and the partitioning plate 12 are installed in the acoustic pipe body 10, and thereby two acoustic pipes with the different passage lengths of two distances L1 and L2 are formed therein. Therefore, it is possible to provide a Helmholtz resonator type acoustic damper whereby a sound absorption effect of two specific frequency bands is obtained. Further, an external force of a sound wave generated on the partitioning plate 12 for forming two acoustic pipes is offset by opposing between the neighboring acoustic pipes, as shown by arrows X and Y in FIG. 3A, so that the partitioning plate 12 can be easily configured.

Figure 4:
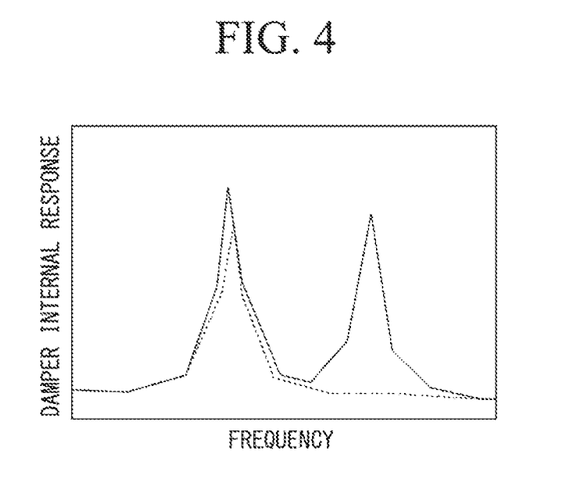
FIG. 4 is a graph illustrating resonance frequency response characteristics of the acoustic damper according to the first embodiment of the present invention and the conventional acoustic damper.

FIG. 4 is a graph illustrating the resonance frequency response characteristics of the acoustic damper, and the solid line shows the response characteristic of the acoustic damper D1 according to the first embodiment of the present invention. The response characteristics illustrated by the solid line show that the sound absorption effect of two specific frequency bands by two acoustic pipes with the different passage lengths based on the two distances L1 and L2 is obtained. On the other hand, the response characteristics illustrated by the dotted line in FIG. 4 show the response characteristics of a conventional acoustic damper D0 illustrated in FIG. 3B, which shows that only the sound absorption effect of one specific frequency band is obtained. The conventional acoustic damper D0 has an acoustic pipe formed so as to have the same passage length with the separating plate 11 in the acoustic pipe body 10.

Second Embodiment

Figure 5:
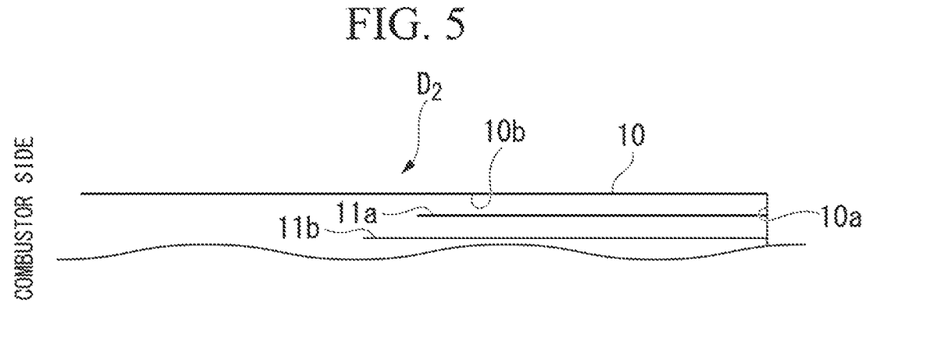
FIG. 5 is a cross-sectional view illustrating an acoustic damper according to a second embodiment of the present invention.

FIG. 5 is a cross-sectional view illustrating a schematic configuration of an acoustic damper D2 according to a second embodiment of the present invention.

This acoustic damper D2 is configured by arranging a plurality of separating plates including separating plates 11a and 11b in an acoustic pipe body 10 like the above-mentioned acoustic damper D1.

The plurality of separating plates including separating plates 11a and 11b are different in extension lengths (lengthwise lengths) from each other and are arranged approximately in parallel at predetermined intervals from each other. Each one end side of the plurality of separating plates is connected to the wall surface 10a opposite to the side at which the acoustic pipe body 10 is attached to the combustor 3. Meanwhile, in FIG. 5, the separating plates arranged closer to the upper side are shorter, and the separating plates arranged closer to the lower side are longer.

In the acoustic damper D2 having the above-mentioned configuration, a plurality of separating plates including the separating plates 11a and 11b are installed in the acoustic pipe body 10, and thereby the plurality of acoustic pipes with the different passage lengths from each other is formed therein. In other words, a plurality of acoustic pipes with different passage lengths can be regarded as being formed in the acoustic pipe body 10, between the upper wall surface 10b of the acoustic pipe body 10 and a surface of the separating plate 11a, and further between neighboring separating plates that are not illustrated.

Figure 6:
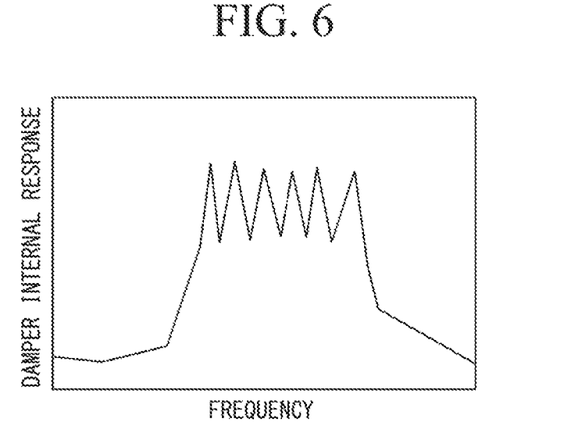
FIG. 6 is a graph illustrating resonance frequency response characteristics of the acoustic damper according to the second embodiment of the present invention.

FIG. 6 is a graph illustrating the resonance frequency response characteristic of the above-mentioned acoustic damper D2. As is clear from this characteristic graph, a sound absorption effect of a plurality of different frequency bands is shown to be obtained by the plurality of acoustic pipes with the different passage lengths.

Further, in this acoustic damper D2, the number of separating plates is not particularly limited. By installing a necessary number of separating plates, it is possible to form acoustic pipes in the acoustic pipe body in a number that is one more than the number of the separating plates.

Third Embodiment

Figure 7:
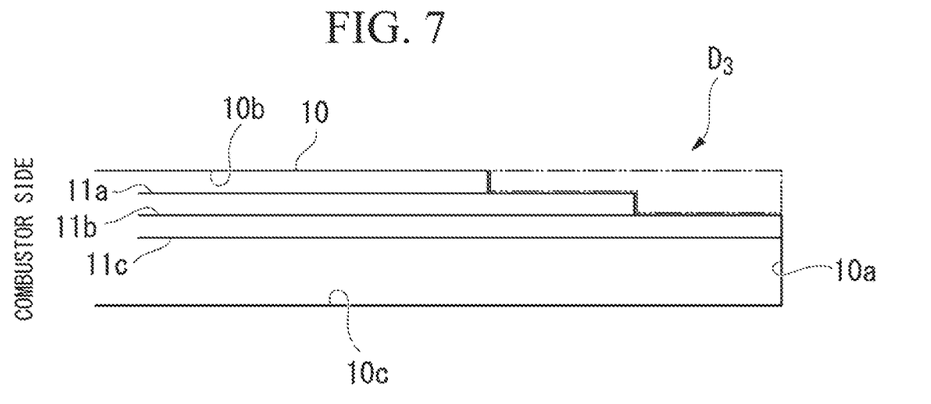
FIG. 7 is a cross-sectional view illustrating an acoustic damper according to a third embodiment of the present invention.

FIG. 7 is a cross-sectional view illustrating a schematic configuration of an acoustic damper D3 according to a third embodiment of the present invention.

This acoustic damper D3 is configured by arranging a plurality (three in the example illustrated in the drawing) of separating plates 11a to 11c in the acoustic pipe body 10.

The separating plates 11a to 11c are different in extension lengths from each other and are arranged approximately in parallel at predetermined intervals from each other. Each one end side of these separating plates 11a to 11c on the side at which the acoustic pipe body 10 is attached to the combustor 3 is arranged in such a way that end portions of the extending direction are aligned. In addition, each of the end portions (the other end sides) of these separating plates 11a to 11c opposite to the side at which the acoustic pipe body 10 is attached to the combustor 3 is connected to the wall surface 10a opposite to the side at which the acoustic pipe body 10 is attached to the combustor 3. Meanwhile, in the example illustrated in the drawing, the extension lengths of the separating plates 11a to 11c are assumed to be 11a<11b<11c. That is, the wall surface 10a of the present embodiment is formed in a staircase shape. Therefore, the external shape of the acoustic pipe body 10 can be made smaller as much as the range shown in the two-dot chain line in FIG. 7.

In the acoustic damper D3 having the above-mentioned configuration, the separating plates 11a to 11c are installed in the acoustic pipe body 10, and thereby the plurality (four in the example illustrated in the drawing) of acoustic pipes with the different passage lengths are formed therein. In other words, the plurality (four) of acoustic pipes with the different passage lengths from each other are formed in the acoustic pipe body 10, between the upper wall surface 10b of the acoustic pipe body 10 and an upper surface of the separating plate 11a, and similarly between a bottom plane of the separating plate 11a and an upper surface of the separating plate 11b, between a bottom plane of the separating plate 11b and an upper surface of the separating plate 11c, and between a bottom plane of the separating plate 11c and a lower wall surface 10c of the acoustic pipe body 10 in the acoustic pipe body 10. Therefore, this acoustic damper D3 can also provide an acoustic damper whereby the sound absorption effect of a plurality of different frequency bands is obtained, like the above-mentioned acoustic dampers D1 and D2.

Further, this acoustic damper D3 was formed with four acoustic pipes using three separating plates 11a to 11c, but a plurality of acoustic pipes may be formed using two or four or more separating plates.

Fourth Embodiment

Figure 8:
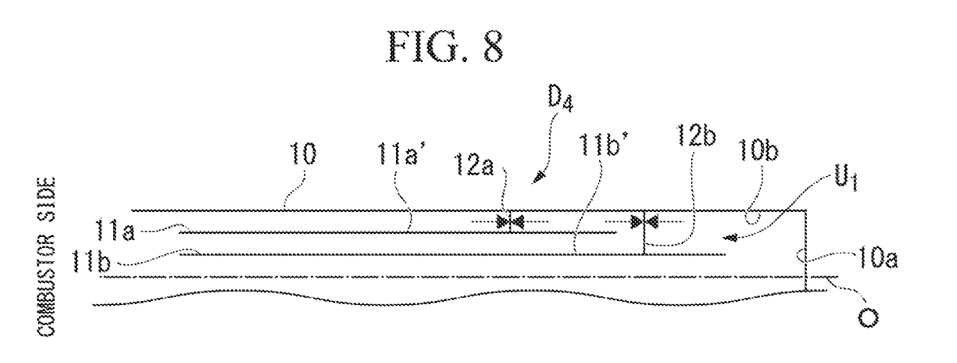
FIG. 8 is a cross-sectional view illustrating an acoustic damper according to a fourth embodiment of the present invention.

FIG. 8 is a cross-sectional view illustrating a schematic configuration of an acoustic damper D4 according to a fourth embodiment of the present invention.

This acoustic damper D4 is configured by arranging a plurality of separating plates including first and second separating plates 11a and 11b and a plurality of partitioning plates including first and second partitioning plates 12a and 12b in the acoustic pipe body 10 like the above-mentioned acoustic dampers D1 and D2.

Because a top and bottom of this acoustic damper D4 are formed to be symmetric with respect to an axis center line O in the lengthwise direction of the acoustic pipe body 10, a unit U1 installed above the axis center line O will be described below.

The separating plates 11a and 11b are different in extension lengths from each other and are arranged approximately in parallel at predetermined intervals from each other. Each one end side of these separating plates 11a and 11b on the side at which the acoustic pipe body 10 is attached to the combustor 3 is arranged in such a way that end portions of the extending direction are aligned. Further, the respective other end sides are arranged so as to separate at a determined distance from the wall surface 10a opposite to the side at which the acoustic pipe body 10 is attached to the combustor 3. Meanwhile, the distance between the other end side of the separating plate 11a and the wall surface 10a is configured so as to be greater than the distance between the other end side of the separating plate 11b and the wall surface 10a. That is, the length of the separating plate 11b in the extending direction is made to be longer than the length of the separating plate 11a in the extending direction.

The partitioning plate 12a is installed between one surface 11a' of the separating plate 11a and the wall surface 10b of the acoustic pipe body 10 facing the one surface 11a, like the partitioning plate 12 of the above-mentioned acoustic damper D1. Further, the partitioning plate 12b is installed between the other end side of the separating plate 11a and the wall surface 10a of the acoustic pipe body 10, and between one surface 11b' of the separating plate 11b and the wall surface 10b of the acoustic pipe body 10 facing the one surface 11b'.

In the unit U1 having the above-mentioned configuration, besides two types of acoustic pipes equivalent to the passages similar to the distances L1 and L2 of the above-mentioned acoustic damper D1, an acoustic pipe which is equivalent to the passage of the distance up to the partitioning plate 12b and bypassing a bottom plane side (a side facing the axis center line O) of the separating plate 11b and the second end side of the separating plate 11b is formed.

A unit U2 installed below the axis center line O along the extending direction of the acoustic pipe body 10 includes a plurality of acoustic pipes formed like the unit using the separating plates and partitioning plates.

In the acoustic damper D4 having the above-mentioned configuration, a plurality of separating plates including the separating plates 11a and 11b and a plurality of partitioning plates including the partitioning plates 12a and 12d are installed in the acoustic pipe body 10, and thereby the plurality of acoustic pipes with the different passage lengths are formed therein. Therefore, it is possible to provide a Helmholtz resonator type acoustic damper whereby a sound absorption effect of a plurality of different frequency bands is obtained. Further, because the external force of the acoustic waves generated on the partitioning plate for forming the acoustic pipes is offset by opposing between the neighboring acoustic pipes, as shown by the arrow in FIG. 8, a plurality of partitioning plates can be easily configured.

Further, in the above-mentioned acoustic damper D4, the acoustic damper is formed with a plurality of acoustic pipes by installing two separating plates and two partitioning plates in each of the top and bottom units. However, the number of units is not particularly limited, and the number of acoustic pipes may be further increased by increasing the number of units. In addition, the number of acoustic pipes may be further increased by increasing the number of separating plates and partitioning plates for every unit.

Fifth Embodiment

Figure 9:
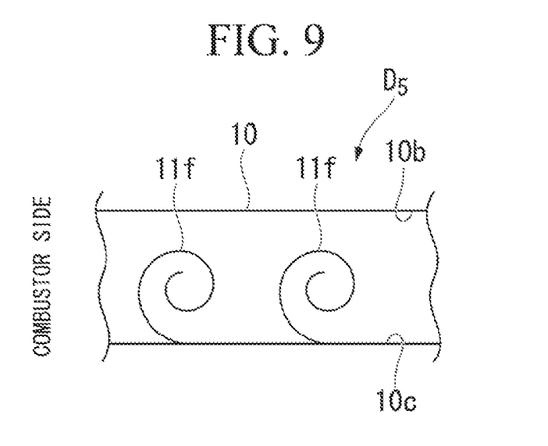
FIG. 9 is a cross-sectional view illustrating an acoustic damper according to a fifth embodiment of the present invention.

FIG. 9 is a cross-sectional view illustrating a schematic configuration of an acoustic damper D5 according to a fifth embodiment of the present invention. The acoustic dampers D5 include a plurality of spirally wound separating plates 11f installed in the acoustic pipe body 10 like the above-mentioned acoustic dampers D1, D2 and D4. The plurality of spirally wound separating plates 11f are arranged on the lower wall surface 10c of the acoustic pipe body 10 in parallel at a predetermined interval in a direction away from the side at which the acoustic pipe body 10 is attached to the combustor 3, while maintaining a predetermined interval from the upper wall surface 10b of the acoustic pipe body 10.

In the acoustic damper D5 having the above-mentioned configuration, the plurality of spirally wound (wound clockwise in the example illustrated in the drawing) separating plates 11f are opposed in the acoustic pipe body 10, and thereby a plurality of acoustic pipes are formed with the end portion of the side at which the acoustic pipe body 10 is connected to the combustor 3 as an inlet and the back (center) of the wound separating plate as a bottom, for every separating plate 11f. Since the plurality of acoustic pipes are each different in passage length, it is possible to provide a Helmholtz resonator type acoustic damper whereby a sound absorption effect of a plurality of different frequency bands is obtained.

Further, in the above-mentioned acoustic damper D5, the number of separating plates is not particularly limited. By adequately installing a necessary number of separating plates, it is possible to form a plurality of acoustic pipes in the acoustic pipe body.

Sixth Embodiment

Figure 10:
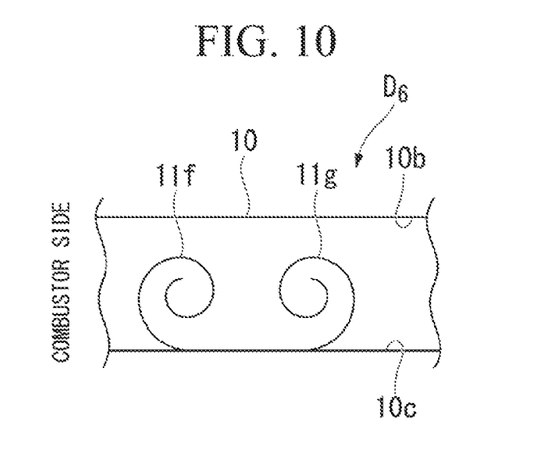
FIG. 10 is a cross-sectional view illustrating an acoustic damper according to a sixth embodiment of the present invention.

FIG. 10 is a cross-sectional view illustrating a schematic configuration of an acoustic damper D6 according to a sixth embodiment of the present invention. This acoustic damper D6 is different from the above-mentioned acoustic damper D5 in that the spirally wound direction of a plurality of spirally wound separating plates installed in the acoustic pipe body 10 is formed so as to be opposite to the spirally wound direction of the other neighboring separating plates. In other words, a clockwise wound separating plate 11f and a counterclockwise wound separating plate 11g are prepared for the separating plates installed in the acoustic pipe body 10, and the plurality of separating plates 11f and 11g are arranged in parallel alternately in a direction away from the side at which the acoustic pipe body 10 is connected to the combustor 3. An auxiliary partitioning plate, which is installed on the lower wall surface 10c of the acoustic pipe body 10 to widely spread the sound waves in each of the separating plates 11f and 11g.

In the acoustic damper D6 having the above-mentioned configuration, the plurality of clockwise wound separating plates 11f and counterclockwise wound separating plates 11g are arranged adjacent to each other in the acoustic pipe body 10, and thereby a plurality of acoustic pipes with the end portion of the side at which the acoustic pipe body 10 is connected to the combustor 3 as the inlet and the back (center) of the wound separating plate as the bottom are formed therein. Since the plurality of acoustic pipes are different in passage length respectively, it is possible to provide a Helmholtz resonator type acoustic damper whereby a sound absorption effect of a plurality of different frequency bands is obtained. Further, the external force of the sound waves generated on the separating plate for forming acoustic pipes is offset by opposing between the neighboring acoustic pipes, as shown by the arrow in FIG. 9, so that the separating plates 11*f* and 11*g* can be easily configured.

Further, in the above-mentioned acoustic damper D6, the number of separating plates is not particularly limited. By adequately installing a necessary number of separating plates, it is possible to form a plurality of acoustic pipe in the acoustic pipe body.

Seventh Embodiment

Figure 11A:
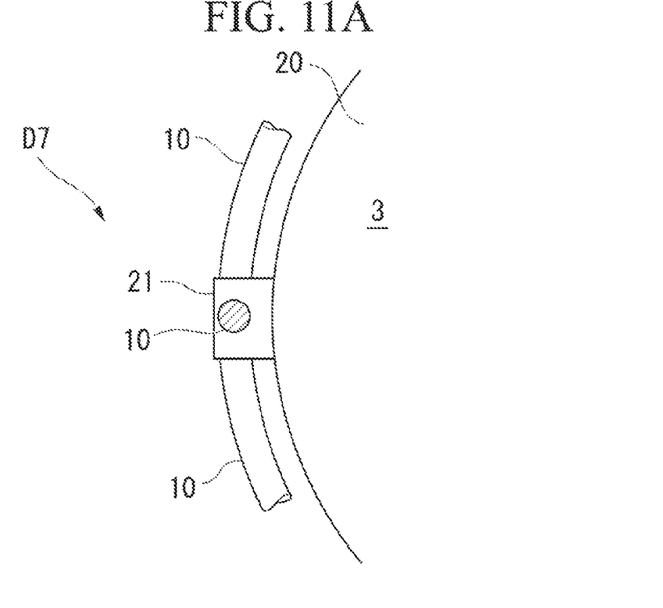
FIG. 11A is a cross-sectional view illustrating a part of the combustor C1 according to the sixth embodiment of the present invention.
Figure 11B:
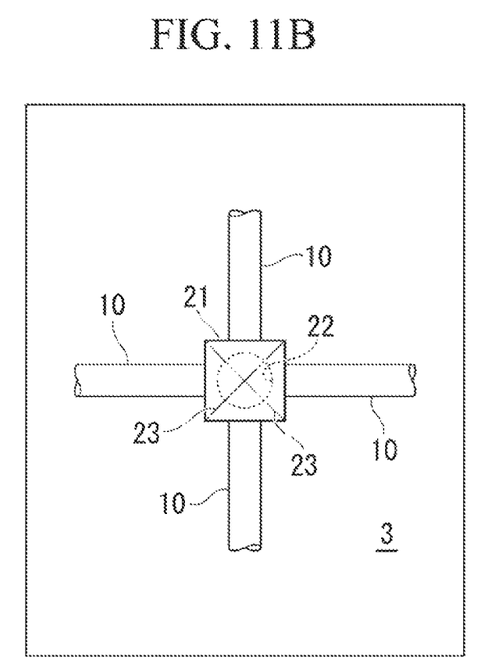
FIG. 11B is a plan view of an acoustic damper D7 mounted on the combustor C1 according to the sixth embodiment of the present invention.

FIG. 11A is a cross-sectional view illustrating a part of a combustor C1 according to a sixth embodiment of the present invention, and FIG. 11B is a plan view of an acoustic damper D7 mounted on the combustor 3.

As illustrated in FIGS. 11A and 11B, the combustor 3 includes an acoustic damper D7 fixed on the wall surface of the outer casing 20. The acoustic damper D7 includes a cuboid shape case (communicating part) 21 fixed on the wall surface of the outer casing 20 and four acoustic pipe bodies 10 connected to the case 21. A hole 22 is formed between the case 21 and the outer casing 20, and a space formed in the case 21 communicates with the inner space of the outer casing 20 through the hole 22. The four acoustic pipe bodies 10 are fixed to the four faces around the case 21 and extend radially about the case 21. Each acoustic pipe body 10 communicates with the inner space of the case 21. The acoustic pipe body 10 can use any structure described in the first to sixth embodiments. Meanwhile, the inside of the case 21 may simply be hollow. However, as illustrated in FIG. 11B for example, partition walls 23 partitioning the space along the diagonal lines may be installed and compartments communicating with the respective acoustic pipe bodies 10 may be formed.

According to the acoustic damper D7 having the above-mentioned configuration, it is possible to obtain the sound absorption effect across a wide band by making the effective frequency band different for every acoustic pipe body 10, and it is thereby possible to contribute to the improvement of noise suppression of the combustor. Further, the plurality of acoustic pipe bodies 10 are connected to the outer casing 20 through one case 21. Therefore, it is possible to reduce the burden of maintenance of the combustor and shorten the work period of time, compared with the case in which a plurality of acoustic pipe bodies 10 are individually connected to the outer casing 20.

The present invention is not limited by the above-mentioned embodiments, but the present invention may include various modifications applied to the above-mentioned embodiments without departing from the gist and scope of the present invention. In other words, the specific shapes and configurations taken in the embodiments are no more than examples, and they may be suitably changed.

INDUSTRIAL APPLICABILITY

The present invention relates to an acoustic damper provided with an acoustic pipe body attached to the combustor. According to the present invention, it is possible to obtain a sound absorption effect of an extensive range of frequency band for the combustor, in spite of a simple structure.

DESCRIPTION OF REFERENCE NUMERALS

1: gas turbine
3: combustor
10: acoustic pipe body
11*a*, 11*b*: separating plate
12*a*, 12*b*: partitioning plate
D1 to D7: acoustic damper
U1, U2: unit
O: axis center line

The invention claimed is:

1. An acoustic damper comprising:
an acoustic pipe body attached to a combustor, the acoustic pipe body being configured to allow communication with an inside of the combustor,
wherein the acoustic pipe body has plurality of passages that are provided inside the acoustic pipe body,
wherein extension lengths of the plurality of passages are different from each other,
wherein the plurality of passages are defined by the acoustic pipe body, a first separating plate and a second separating plate which are installed in the acoustic pipe body, a first partitioning plate installed between an inner wall surface of the acoustic pipe body and the first separating plate, and a second partitioning plate installed between the inner wall surface of the acoustic pipe body and the second separating plate,
wherein one end side of the first separating plate in the extending direction is arranged separately from a wall surface opposite to the side at which the acoustic pipe body is attached to the combustor,
wherein the first partitioning plate is installed between a first surface of the first separating plate and the inner wall surface of the acoustic pipe body facing the first surface,
wherein the second separating plate is installed in parallel at a predetermined interval on a second surface side of the first separating plate,
wherein one end side of the second separating plate in the extending direction is installed separately from the wall surface opposite to the side at which the acoustic pipe body is attached to the combustor,
wherein in a space formed between the one end side of the first separating plate and the wall surface opposite to the side at which the acoustic pipe body is attached to the combustor, the second partitioning plate is installed between a first surface of the second separating plate and the inner wall surface of the acoustic pipe body facing the first surface,
wherein a unit is formed by the inner wall surface of the acoustic pipe body, the wall surface opposite to the side at which the acoustic pipe body is attached to the combustor, the second partitioning plate and the second separating plate, and
wherein the unit is symmetrically installed about an axial center line along the extending direction of the acoustic pipe body.

2. The acoustic damper according to claim 1, wherein the acoustic pipe body comprises a plurality of acoustic pipe bodies,
the plurality of acoustic pipe bodies extends radially about a communicating portion with the combustor.

3. A combustor comprising the acoustic damper according to claim 1 attached thereto.

4. A gas turbine comprising the combustor according to claim 3.

* * * * *